United States Patent [19]

Dunn

[11] 3,879,753

[45] Apr. 22, 1975

[54] PHASE LOCKED LOOP CLOCKING SYSTEM

[75] Inventor: David S. Dunn, Windham, N.H.

[73] Assignee: Honeywell Information Systems, Inc., Waltham, Mass.

[22] Filed: Jan. 2, 1974

[21] Appl. No.: 430,375

[52] U.S. Cl. .................................................. 360/51
[51] Int. Cl. .................................................. G11b 5/00
[58] Field of Search ........................... 360/51, 42, 39

[56] References Cited

UNITED STATES PATENTS

| | | | |
|---|---|---|---|
| 3,493,868 | 2/1970 | Hackett, Jr. | 360/42 |
| 3,689,903 | 9/1972 | Agrewala | 360/51 |
| 3,765,005 | 10/1973 | Cannon | 360/51 |
| 3,789,379 | 1/1974 | Breikss | 360/51 |

*Primary Examiner*—Vincent P. Canney
*Attorney, Agent, or Firm*—William F. White; Ronald T. Reiling

[57] ABSTRACT

A phase locked loop clocking system is disclosed which phase locks onto information previously recorded on a magnetic media. The information consists of sets of magnetic flux reversals that produce a train of alternating dipulses in a read transducer when the magnetic media is caused to be moved relative to the transducer. The phase locked loop clocking system includes a detection portion which is connected to the transducer and detects optimal phase locking points within the train of dipulses. The phase locked loop clocking system furthermore includes a phase detector connected to the output of the detection portion which detects any phase difference between the train of dipulses and the clocking signal from a voltage controlled oscillator. The phase detector discounts any pulse dropout in the train of dipulses so as to not generate an erroneous out of phase condition with respect to the clocking signal.

24 Claims, 5 Drawing Figures

PHASE LOCKED LOOP CLOCKING SYSTEM

BACKGROUND OF THE INVENTION

This invention relates to phase locked loop clocking systems which phase lock a clocking signal with respect to a moving magnetic media. In particular, this invention relates to a particular phase locked loop clocking system which phase locks onto a particular previously recorded signal on a megnetic disc.

The purpose of a phase locked loop clocking system is to generate a clock signal which can be phase locked onto an externally applied signal. Phase locking is accomplished by first detecting any phase difference which may occur between the externally applied signal and the clock signal. The frequency of the clock signal is then varied so as to eliminate this detected phase difference.

The type of signal which is applied to the input of a phase locked loop clocking system dictates to a great extent what is required of the system. The particular input signal to the phase locked loop clocking system of the present invention consists of a series of alternating individually distinguishable dipulse wave shapes. These dipulse wave shapes are often imperfectly shaped due to the imperfections of reading back the information which has been previously recorded on the magnetic media. It is, therefore, difficult to find a point on these dipulse wave shapes which is not appreciably adversely affected by the imperfections of the magnetic readback. The particular input signal to the phase locked loop clocking system of the present invention is furthermore complicated by the fact that periods occur wherein there is a dropout of the dipulse wave shapes.

OBJECTS OF THE INVENTION

It is therefore an object of the present invention to provide a phase locked loop clocking system which phase locks onto a series of alternating individually distinguishable dipulse wave shapes.

It is another object of the present invention to provide a phase locked loop clocking system which phase locks onto a point in each dipulse wave shape which is not appreciably adversely affected by imperfections in magnetic readback.

It is a still further object of the present invention to provide a phase locked loop clocking system which is capable of maintaining a phase locked condition during periods of dipulse dropout.

SUMMARY OF THE INVENTION

The above objects are achieved according to the present invention by providing a phase locked loop clocking system that first of all detects and isolates optimal points on the dipulse wave shapes for phase locking with respect to. These optimal points periodically occur as a function of the speed of the magnetic media. These periodically occurring optimal points are used to generate a reference signal.

The generated reference signal is applied to a phase detector which detects any phase difference between the applied reference signal and a feedback signal from the output of a voltage controlled oscillator. Any detected phase difference is applied to a low pass filter which in turn applies a correction voltage to the VCO so as to either increase or decrease the frequency of the VCO. The phase detector is capable of recognizing when a pulse dropout occurs in the generated reference signal so as to not generate an erroneous phase difference to the low pass filter.

The entire phase locked loop also contains an initializing circuit for correcting any initial non-synchronous condition in the VCO.

BRIEF DESCRIPTION OF THE DRAWINGS

For a better understanding of the present invention, reference should be made to the accompanying drawings wherein.

DETAILED DESCRIPTION OF THE PREFERRED EMBODIMENT

Figure 1:
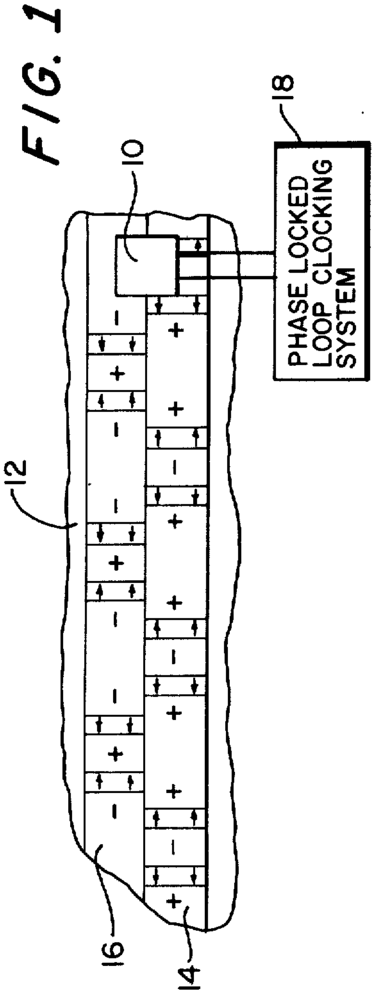
FIG. 1 is a schematic illustration of a magnetic head which is in transducing relationship with a magnetic media, and is furthermore connected to a phase locked loop clocking system.

Referring to FIG. 1, a magnetic trasducer 10 is shown in transducing relationship with a magnetic media 12 which contains a pair of previously recorded tracks 14 and 16. The recordings in the tracks 14 and 16 comprise areas of magnetization which are either polarized in a first direction as indicated by a positive sign or polarized in a second direction as indicated by a negative sign. The double dividing lines between these oppositely signed areas represent where changes in magnetic polarization occur. Changes in magnetic polarization are commonly referred to as magnetic flux reversals and are indicated by the arrows within the double dividing lines. Track 14 is seen to normally be in a positive magnetic state with sets of flux reversals to and from a negative magnetic state. On the other hand, the recording in track 16 is normally in a negative magnetic state with sets of flux reversals to and from a positive magnetic state. It is to be noted that the sequential changes in magentic state in the track 16 are positioned between the sequential changes in magnetic state in the track 14. It is to be furthermore noted that the transducer 10 is equally centered over the tracks 14 and 16 so as to respond equally to the flux reversals in each track. It will become apparent hereinafter that such a transducer position is not required. The signal which is produced in the magnetic transducer 10 in response to these flux reversals is applied to a phase locked loop clocking system 18 in FIG. 1.

Figure 2:
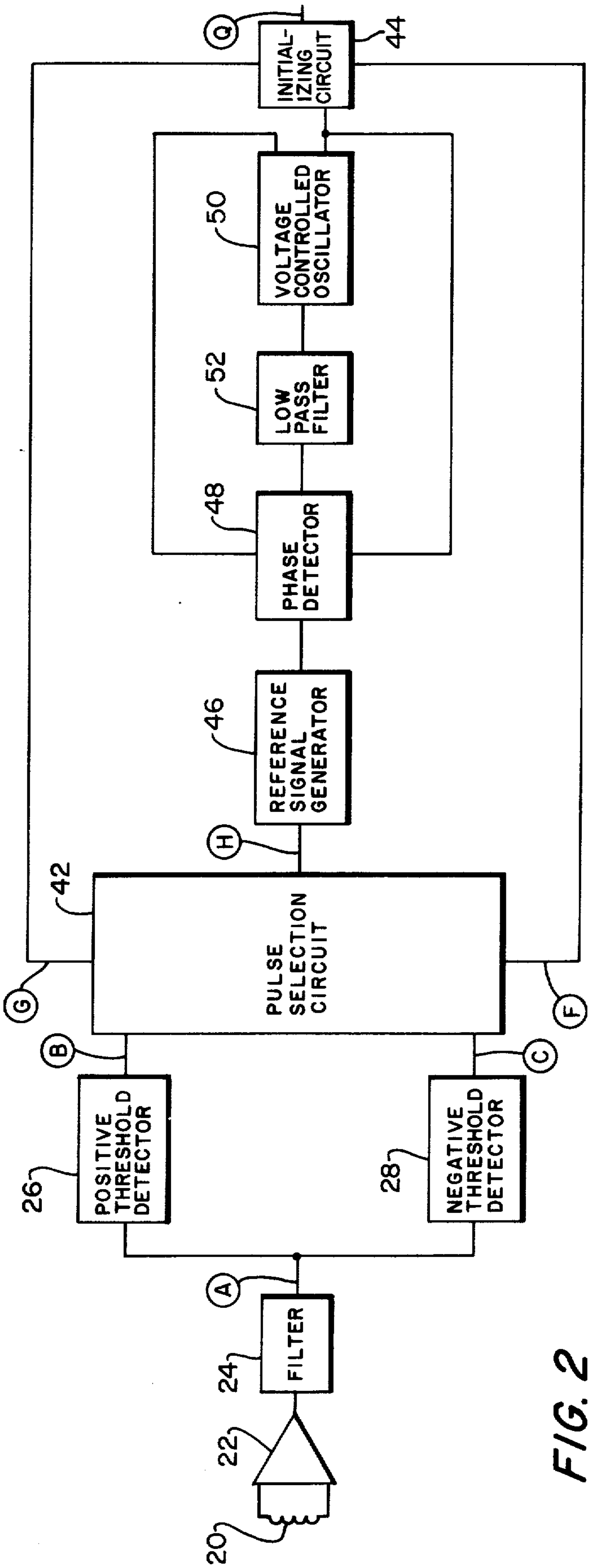
FIG. 2 is an overall block diagram of the phase locked loop clocking system of FIG. 1.

Referring to FIG. 2, a winding 20 from the magnetic transducer 10 of FIG. 1 is connected to an amplifier 22 which constitutes the first component of te phase locked loop clocking system 18 of FIG. 1. The winding 10 produces a voltage signal response to the flux reversals previously recorded in the tracks 14 and 16 of FIG. 1. This voltage signal response is applied to the amplifier 22. The amplifier 22 is preferably of the automatic gain control type with a gain control such as is disclosed in copending and commonly assigned U.S. application Ser. No. 430,343, filed on even date herewith, entitled, "Transducer Positioning system,"by William A. Braun et al. The output of the amplifier is filtered through a low-pass filter 24 and thereafter applied to a positive threshold detector 26 and a negative threshold detector 28. Threshold detectors are well known in the art and will not be disclosed in detail. One illustrative type of threshold detector which may be used is that of a high gain amplifier whose input is biased so as to cause the amplifier to immediately saturate when the signal applied to the biased input exceeds the threshold voltage.

Figure 3:
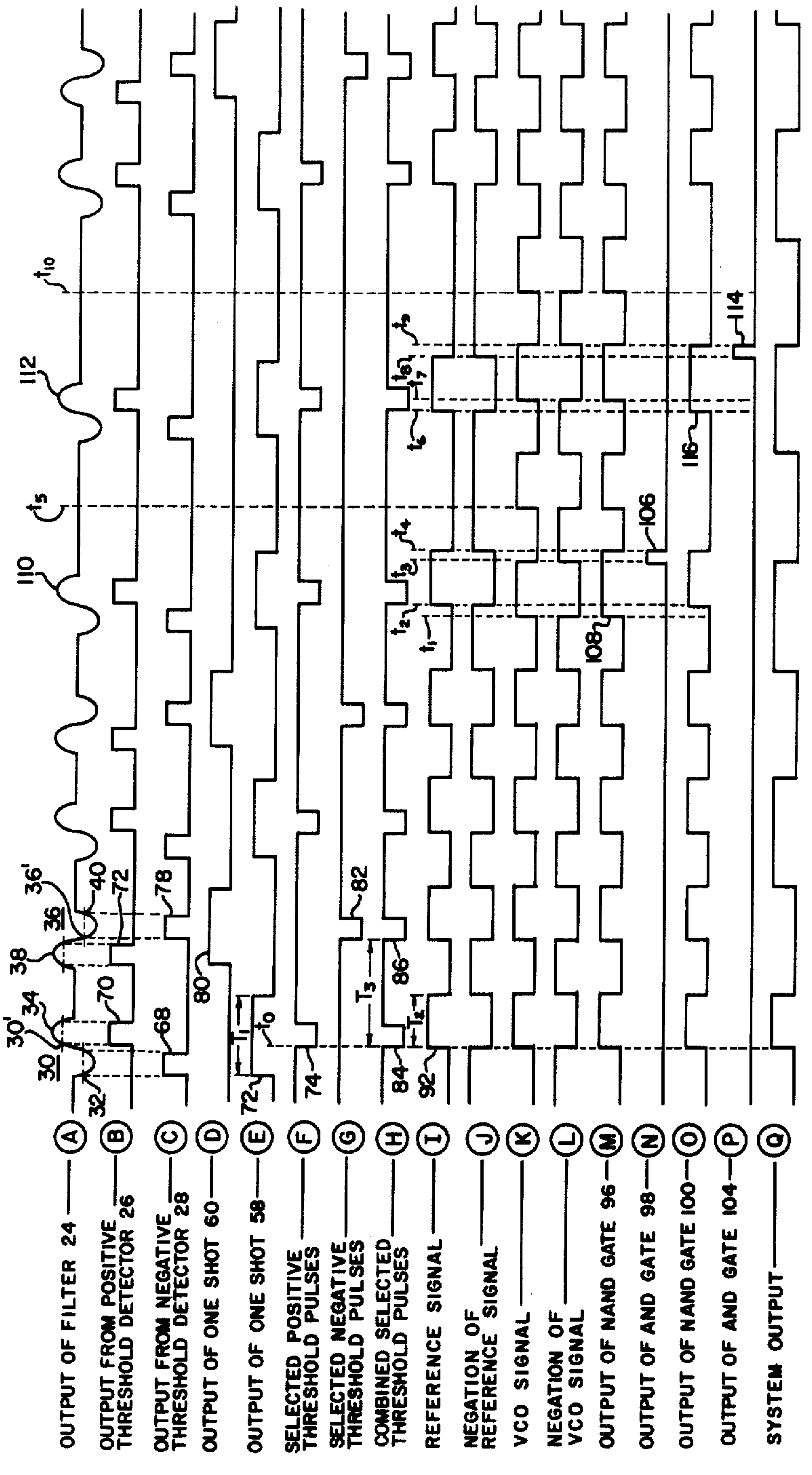
FIG. 3 is a timing diagram illustrating various signal wave forms which occur at the designated locations in the phase locked loop clocking system of FIG. 2.

Examples of possible waveforms appearing at the alphabetically labeled outputs of the filter 24 and the positive and negative threshold detectors 26 and 28 are illustrated in FIG. 3. The waveform A appears at the output of the filter 24 and represents the amplified and filtered voltage signal from the winding 20. The waveform A comprises a series of reoccurring wave shapes, each of which consists of two pulses, one of which is positive, and the other being negative. These wave shapes will be hereinafter referred to as dipulses. The first dipulse 30 in waveform A begins with a negative pulse 32 followed by a positive pulse 34. Since the dipulse 30 is an initially negative-going dipulse, it will hereinafter be referred to as a negative dipulse. The next dipulse 36 to occur in wave form A begins with a positive pulse 38 followed by a negative pulse 40. Since the dipulse 36 begins with an initially positive-going pulse 38, it will hereinafter be referred to as a positive dipulse. The negative dipulse 30 followed by the positive dipulse 36 represents the sensing of the different recorded information in the tracks 14 and 16 in FIG. 1.

Wave forms B and C of FIG. 3 represent the respective output signals from the positive and negative threshold detectors 26 and 28 in response to the dipulses of wave form A. The wave form B is positive each time a dipulse in the wave form A exceeds 50 percent of the positive peak amplitude. This is illustrated for example in FIG. 3 by the dotted line relationships between the 50 percent amplitude levels of the positive pulses 34 and 36 and the resulting pulses in the wave from B. The wave form C is positive each time the dipulses in wave form A exceed 50 percent of the negative peak amplitude. This is illustrated for example in FIG. 3 by the dotted line relationship between the 50 percent amplitude levels of the negative pulses 32 and 40 and the resulting pulses in the wave form C.

The aforementioned 50 percent peak amplitude levels constitute the preferred threshold detection levels for the positive and negative threshold detectors respectively. It is to be understood, however, that the setting of the threshold detection level can be varied within the scope of the invention.

Returning now to FIG. 2, the output signal of the positive and negative threshold detectors 26 and 28 are applied to a pulse selection circuit 42. The pulse selection circuit 42 selects certain threshold pulses from the positive and negative threshold detectors 26 and 28 and generates three separate trains of selected threshold pulses at its three outputs F, G and H. The selection process within the pulse selection circuit 42 will be described in detail hereinafter. Suffice it to say at this point that the pulse selection circuit 42 selects the threshold pulse output from only one of the two threshold detectors during the occurrence of any one dipulse. The threshold pulse output which is selected is always that threshold pulse resulting from the threshold detection of the second pulse to occur in any given dipulse.

Referring to FIG. 3, the threshold pulse output of wave form B from the positive threshold detector 26 is always selected when a negative dipulse such as 30 occurs in the wave form A. This is demonstrated by the occurrence of a pulse in the generated train of selected threshold pulses of wave form F for each negative dipulse in the wave form A. Similarly, the threshold pulse output of wave form C from the negative threshold detector 28 is always selected by the pulse selection circuit 42 when a positive dipulse such as 36 occurs in the wave form A. This is demonstrated by the occurrence of a pulse in the generated train of selected threshold pulses of wave form G for each positive dipulse in the wave form A. The pulse selection circuit 42 also combines the selected threshold pulses of wave forms F and G and generates a combined train of selected threshold pulses indicated by the wave form H.

It is to be appreciated that the leading edge of a selected threshold pulse in any of the wave forms F, G or H defines a particular reliable data point on the corresponding dipulse waveshape of the wave form A. Specifically, the leading edge of each selected threshold pulse defines a point on the second pulse of each dipulse wherein the dipulse amplitude first exceeds the threshold setting. In the case of the negative dipulse 30, this is point 30', and in the case of the positive dipulse 36, this is point 36'. It is to be noted that these points lie on the steep slope which occurs during the transition from the peaking of the first pulse to the peaking of the second pulse in each dipulse waveshape. This steep slope minimizes the uncertainty of when these particular points occur within their respective dipulses. It is to be understood that while a threshold amplitude detection set at 50 percent of the positive and negative peak amplitudes of the dipulses 30 and 36 is preferred, other fractional amplitude detections along the steep slopes are within the scope of the invention.

Returning to FIG. 2, the outputs F and G from the pulse selection circuit 42 are applied to an initializing circuit 44. The initializing circuit 44 is operative to initially assign either a logically high or low value to the output Q of the phase locked loop clocking system 18 depending on whether a negative or positive dipulse is occurring in the wave form A. This will be explained in detail hereinafter.

The combined train of selected threshold pulses occurring at the output H of the pulse selection circuit 42 is applied to a reference signal generator 46 which generates the assertion I and the negation J of a reference signal. These reference signals are applied to a phase detector 48 which detects any phase difference between the reference signals and the assertion and negation of a VCO signal which is fed back from a voltage controlled oscillator 50. Any detected phase difference from the phase detector 48 is applied to a low-pass filter 52. The output of the low-pass filter 52 retains the indicated phase difference from the phase detector 48 as a voltage level which is applied to the voltage controlled oscillator 50. The voltage controlled 50 will either speed up or slow down depending on the voltage level applied from the low-pass filter 52.

Figure 4:
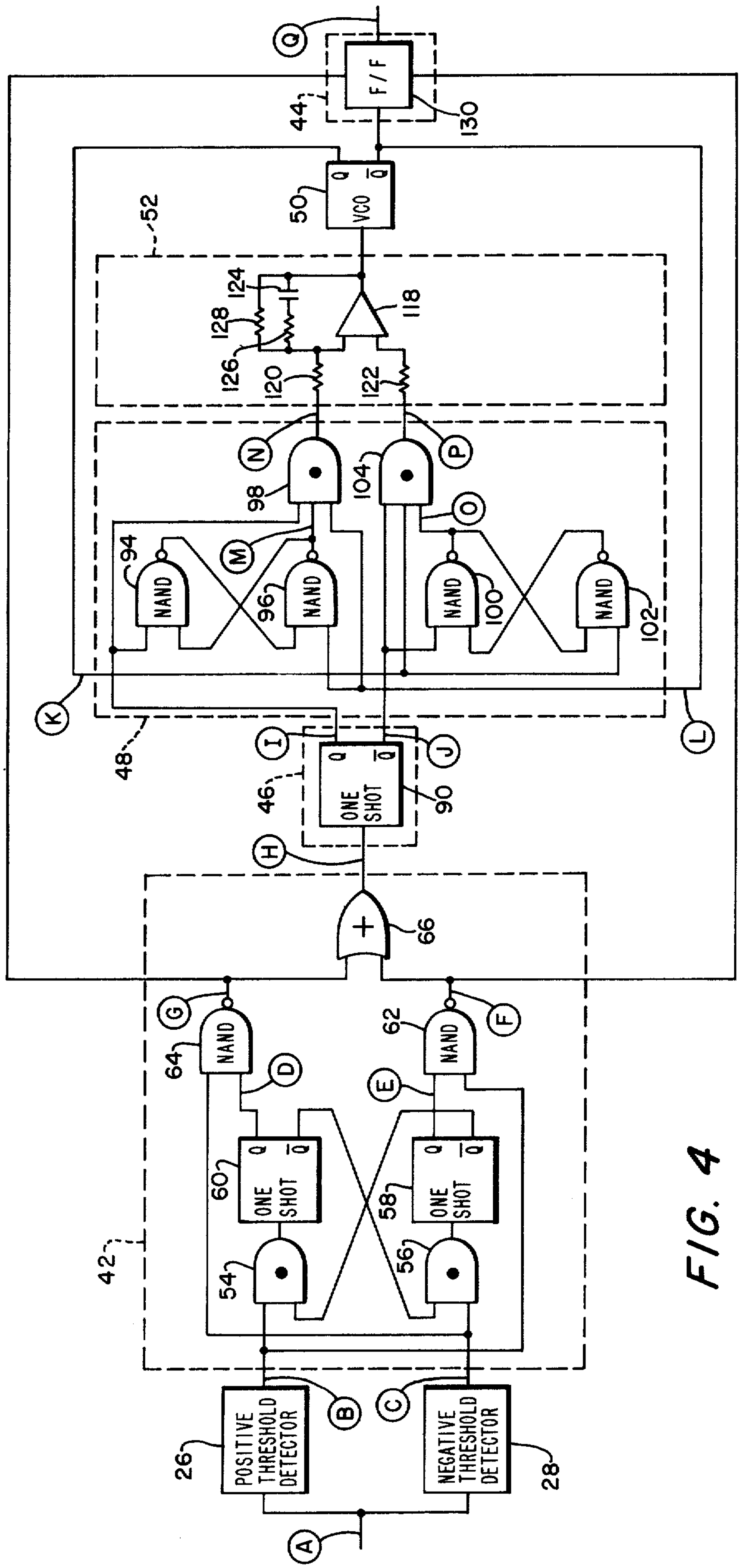
FIG. 4 is a detailed illustration of the phase locked loop clocking system of FIG. 2.

FIG. 4 is a more detailed illustration of FIG. 2 in which the elements of the pulse selection circuit 42, the pulse shaping circuit 46, the phase detector 48 and the low-pass filter 52 are more explicitly set forth.

The pulse selection circuit 42 begins with a set of AND gates 54 and 56 which receive the respective threshold pulse output signals from the positive and negative threshold detectors 26 and 28. The threshold pulse output signals B and C from the positive and negative threshold detectors 26 and 28 are gated through the AND gates 54 and 56 in response to signal levels from the negation outputs of the one shots 58 and 60. The one shots 58 and 60 are in turn conditioned by the output signals from the AND gates 54 and 56. The affirmative output signal from the one shot 58 is applied to a NAND gate 62 which also receives the threshold pulse output signal B from the positive threshold detector 26. The affirmative output signal from the one shot 60 is applied to a NAND gate 64 which receives the threshold pulse output signal C from the negative threshold detector 28. The output signals of the NAND gates 62 and 64 are combined at an OR gate 66.

The operation of the pulse selection circuit 42 is best understood by first of all noting that the positive and negative threshold detectors 26 and 28 each generate a threshold pulse for each occuring dipulse. Referring to FIG. 3, it is seen that the negative pulse 32 of the negative dipulse 30 causes a threshold pulse 68 to occur at the output of the negative threshold detector 28, whereas the positive pulse 34 causes a threshold pulse 70 to occur at the output of the positive threshold detector 28. It will be remembered that only the second threshold pulse 70 is to be selected by the pulse selection circuit 42.

This selection process begins with the threshold pulse 68 from the negative threshold detector 28 being gated through the AND gate 56 due to the negation from the one shot 60 being high. The gated threshold pulse 68 causes the one shot 58 to go high thus producing a pulse 72 at its output. The duration $T_1$ of the pulse 72 is set to last at least as long as the remainder of the negative dipulse 34. It is to be noted that the duration $T_1$ of the pulse 72 can be extended past the termination of the dipulse 34 with the only constraint being that the pulse 72 is to be terminated prior to the occurrence of the next dipulse 38. The pulse 72 from the one shot 58 is combined at the NAND gate 62 with the threshold pulse 70 from the positive threshold detector 26. The NAND gate 62 goes low for the duration of the threshold pulse 70 so as to produce a selected threshold pulse 74 in the wave from F. While the NAND gate 62 is thus seen to go low in response to the second occurring threshold pulse 70, the NAND gate 64 which receives the first occurring threshold pulse 68 remains high and does not produce a corresponding selected threshold pulse. This is due to the one shot 60 being low for the duration of the negative dipulse 30.

The signal conditioning on the NAND gates 62 and 64 is reversed for the positive dipulse 36 which produces a first occurring threshold pulse 76 from the positive threshold detector 26 followed by a second occurring threshold pulse 78 from the negative threshold detector 28. The first occurring threshold pulse 76 is gated through the AND gate 54 to the one shot 60 which generates a pulse 80 of duration $T_1$. The NAND gate 64 hence goes low when the second occurring threshold pulse 78 is applied to its input. This is indicated by the occurrence of the selected threshold pulse 82 in the wave form G appearing at the output of the NAND gate 64.

In summary, the NAND gates 62 and 64 are conditioned by their respective one shots 58 and 60 in response to the first occurring threshold pulse within each dipulse. This conditioning of the NAND gates is such as to produce a selected threshold pulse corresponding to the second occurring threshold pulse within each alternating dipulse.

The remaining function which is accomplished within the pulse selection circuit 42 is that of combining the outputs from the NAND gates 62 and 64 at an OR gate 66 so as to produce a combined train of selected threshold pulses exemplified by wave form H. In particular, the wave form H contains selected threshold pulses 84 and 86 which reflect the aforementioned selected threshold pulses 74 and 82.

The train of selected threshold pulses from the OR gate 66 of the pulse selection circuit 42 is applied to the reference signal generating circuit 46 which is comprised of a one shot 90. The one shot 90 is timed so as to generate reference pulses of a width $T_2$ for each pulse occurring in the selected threshold pulse train from the OR gate 66. This is illustrated by the reference pulse 92 of the wave form I which represents the affirmative output of the one shot 90. The pulse width $T_2$ is particularly chosen to be one-half of the normal spacing between similar points on the alternately occurring dipulses in the wave form A. In this regard, the pulse width $T_2$ in the wave form I is one-half of the time period $T_3$ between the selected threshold pulses 84 and 86 in the wave form H, whose leading edges represent similar 50 amplitude points on the dipulses 30 and 38. It is to be furthermore noted that the one shot 90 also produces a negation output signal which is represented by the wave form J in FIG. 3. The affirmative and negation output signals from the one shot circuit 90 constitute the reference signal and the negation thereof which will be applied to the phase detector 48 for comparison with the fedback VCO signals from the voltage controlled oscillator 50.

The phase detector 48 in FIG. 4 comprises an upper set of cross-coupled NAND gates 94 and 96 with an associated AND gate 98 and a lower set of cross-coupled NAND gates 100 and 102 with an associated AND gate 104. The upper set of cross-coupled NAND gates 94 and 96 and their associated AND gate 98 receive as external inputs: the reference signal from the one shot 90 and the negation of the VCO signal from the voltage controlled oscillator 50. The lower set of cross-coupled NAND gates 100 and 102 and their associated AND gate 104 receive as external inputs: the negation of the reference signal from the one shot 90 and the VCO signal from the voltage controlled oscillator 50. It will be shown hereinafter that the upper set of cross-coupled NAND gates 94 and 96 and their associated AND gate 98 operate to produce a phase difference pulse when the VCO signal leads the reference signal. It will also be shown hereinafter that the lower set of cross-coupled NAND gates 100 and 102 and their associated AND gates operate to produce a pase difference pulse when the VCO signal lags the reference signal.

Referring to FIG. 3, the VCO signal which is indicated by the wave form K leads the reference signal which is indicated by the wave form I at a time $t_1$. It will be shown that the upper set of cross-coupled NAND gates 94 and 96 and the associated AND gate 98 operate to produce a leading phase difference pulse 106 in the wave form N indicative of this phase lead situation.

At time $t_1$, the reference signal of wave form I is still low and hence the output of the NAND gate 94 of FIG. 4 is logically high. The high level output of the NAND gate 94 is applied to the input of the NAND gate 96 which also receives the VCO negation signal indicated by the wave form L of FIG. 3. Since the VCO negation signal goes from high to low at time $t_1$, the output of the NAND gate switches from low to high as is indicated by a pulse 108 in the NAND gate 96 output wave form of FIG. 3. The NAND gate 96 output wave form M, together with the reference signal wave form I and the VCO negation signal wave form L, are ANDed by the AND gate 98. The reference signal wave form I goes high at time $t_2$ while the VCO negation signal wave form L goes high at time $t_3$. At time $t_3$, all inputs to the AND gate 98 are high which produces the leading phase difference pulse 106 at the output of the AND gate 98 indicated by the wave form N. The AND gate 98 output wave form N remains high until the reference signal wave form I goes low at a time $t_4$.

It should be noted that the pulse 108 in the NAND gate 96 output wave form M remains high at the time $t_3$ even though the VCO negation signal wave form L goes high at this time. This is due to the NAND gate 94 going low at time $t_2$ in response to the reference signal wave form I going high. The NAND gate 94 does however go high at time $t_4$ when the reference signal wave form I goes low. With the output of the NAND gate 94 high, the NAND gate 96 goes low, hence terminating the pulse 108.

The phase detector circuit 48 has been shown to be capable of detecting a phase lead of the VCO signal with respect to the reference signal. Before turning to the phase lag situation, it will be shown that the phase detector 48 is immune to dipulse drop out in the wave form A. Specifically, looking at the wave form A at time $t_5$, it is seen that a normal occurring positive dipulse is missing between the negative dipulses 110 and 112. This results in the one shot 90 not producing a normal pulse in the reference signal wave form I at the time $t_5$. Due to the missing pulse in the reference signal wave form I, the AND gate 102 will not go high, and hence there will not be an erroneously detected phase lead by the phase detector 48.

Moving on until time $t_6$ wherein a phase lag situation occurs as the VCO signal wave form K lags the reference signal wave form I, it will be shown that the lower set of NAND gates 100 and 102 and their associated AND gate 104 operate to produce a lagging phase difference pulse 114 in the wave form P indicative of this phase lag situation. At time $t_6$, the reference negation signal wave form J goes low causing the NAND gate 100 to go high thus producing a pulse 116 in the NAND gate 100 output wave form O. The pulse 116 is sustained even when the reference signal negation signal wave form J goes high again at time $t_8$ due to the output of the NAND gate 102 going low at time $t_7$ in response to the VCO signal wave form K going high at time $t_7$. The NAND gate 100 output wave form O, together with the reference negation signal wave form J and the VCO signal wave form K are ANDed by the AND gate 104. The VCO signal wave form K goes high at time $t_7$ followed by the negation signal wave form J going high at time $t_8$. At time $t_8$, all inputs to the AND gate 104 are high thus producing the lagging phase difference pulse 114 in the wave form P occurring at the output of the AND gate 104. This pulse is sustained until the clock signal wave form K goes low at time $t_9$. The lagging phase difference pulse 114 therefore represents the phase lag of the VCO signal wave form K with respect to the reference signal wave form I.

Moving on until time $t_{10}$, it is seen that a positive dipulse does not occur after the negative dipulse 112. This results in the one shot 90 not producing a normal pulse in the reference signal waveform I at this time. The non-occurrence of a normal pulse in the reference signal waveform I results in the output of the NAND gate 100 which is indicated by the waveform O not being high at time $t_{10}$. With the output of the NAND gate 100 being low, the AND gate 104 is disabled, and hence an erroneously detected phase lag pulse cannot occur at its output. As has been previously pointed out, the AND gate 102 will not respond so as to produce an erroneous phase lead pulse in the event that a normal pulse in the reference signal wave form I is missing. Hence, it is to be understood that the phase detector 48 will not erroneously detect either a phase lead or a phase lag when a dipulse drop-out occurs.

The phase difference pulses from the phase detector 48 are applied to the low pass filter 52. Referring to FIG. 4, the low pass filter comprises an operational amplifier 118 connected in an integrating configuration to a set of input resistors 120 and 122. The integrating configuration consists of a feedback capacitor 124 in series with a feedback resistor 126. A feedback resistor 128 causes low pass filter 52 to actually perform a first order lag function as opposed to pure integration. The operational amplifier configuration is well known in the art and the exact circuit design in terms of resistance and capacitance values are a matter of specific engineering design based upon bandwidth consideration of the input signals.

The operation of the low pass filter for both the phase lead situation and the phase lag situation will now be explained. Taking first the phase lead situation, it will be remembered that for this case, the phase detector 48 produces the leading phase difference pulse 106 as the output of the AND gate 98. This pulse is applied through the input resistor 120 to the inverting input of the operational amplifier 118. The integrating configuration of the operational amplifier will integrate the phase difference pulse 106 and provide a constant correctional voltage to the voltage controlled oscillator 50. The correctional voltage will be inverted with respect to the puse 106 so as to lower the frequency of the voltage controlled oscillator 50 and hence remove the phase lead of the VCO signal with respect to the reference signal. Voltage controlled oscillators are well known in the art and include such devices as a-stable multivibrators which could be used as the voltage controlled oscillator device 50 in FIG. 4.

The low pass filter 52 causes the voltage controlled oscillator 50 to increase in speed for a detected phase lag situation which it will be remembered occurred at the time $t_6$. This phase lag resulted in the lagging phase difference pusle 114 appearing at the output of the AND gate 104. The lagging phase difference pulse 114 is applied through the input resistor 122 to the non-inverting input of the operational amplifier. The resulting constant correctional voltage is applied to the voltage controlled oscillator 50 which will increase in frequency so as to close the detected phase lag of the VCO signal with respect to the reference signal.

It is to be noted that the phase lag and the phase lead situations depicted in FIG. 3 are of a first order nature. In other words, the phase difference between the reference signal and the VCO signal has not been due to a frequency difference, but rather has been due to an out of phase relationship between two signals of the same frequency. While a frequency differential has not been shown in FIG. 3, it should nonetheless be understood that such a condition is handled by the phase detector 48.

One signal processing step remains within the phase locked loop clocking system 18, namely, that of initially assigning a logic level to the output of he system. The initializing circuit 44 operates to initially assign a signal level to the output of the system which depends on the type of dipulse occurring at the input to the phase locked loop clocking system 18. This is of course only necessary for certain applications of the clocking signal output from the phase locked loop clocking system. Referring to FIG. 4, the initializing circuit 44 consists of a set/reset flip-flop 130 wherein the set side receives the output of the NAND gate 64 and the reset side receives the output of NAND gate 62. Referring to FIG. 3, it will be remembered that the wave form F (which constitutes the output of the NAND gate 62) contains a pulse for each negative dipulse occurring in the wave form A whereas the wave form G (which constitutes the output of the NAND gate 64) contains a pulse for each positive dipulse occurring in the wave form A. The effect of applying these pulses from their respective NAND gate outputs to the reset and set sides of the flip-flop 130 is to set or reset the phase locked loop clocking system output depending on whether a negative or positive dipusle is occurring at the input.

Referring to the system output wave form Q in FIG. 3, it is seen that the output of the flip-flop 130 is initially low at the beginning of the negative dipulse 30 in the wave form A. This low level represents the status of the flip-flop 30 when the phase locked loop system was previously turned off. It is to be understood that the input signal present at the input to the system when it was previously turned off could be different from the input signal represented by the wave form A which is present when the phase locked loop clocking system 18 is intially powered up for the input exemplified by wave form A in FIG. 3. Such a signal difference has occurred in FIG. 3 as the signal level in the output wave form A is low instead of being high for the negative dipulse 30. This situation is rectified however at time $t_o$ when the NAND gate 62 produces the pulse 74 in the wave form F which resets the flip-flop 130 high. It is to be understood that the flip-flop 130 would be set low by the NAND gate 64 for an erroneous initial high signal level occurring in conjunction with a positive dipulse.

It will be remembered that the transducer 10 is centered between the tracks 14 and 16 in FIG. 1 so as to respond equally to the flux reversals in each track. This condition is not necessary in order for the phase locked loop clocking system 18 to function. If the transducer 10 were not centered, then one of the types of dipulses in the wave form A of FIG. 3 would be larger than the other type of dipulse. This condition is illustrated by the waveform A of FIG. 5 which begins with a positive dipulse 132 followed by a relatively small and insignificant negative dipulse 134. The dipulses 132 and 134 represent a situation wherein the transducer 10 of FIG. 1 is positioned over one track, such as the track 14. This situation changes though as the transducer 10 moves toward an "on-center" condition as indicated by the waveform A in FIG. 5. At this point the positive and negative dipulses are equal as indicated by the positive dipulse 136 and the negative dipulse 138. The transducer 10 again moves off-center as indicated by the diminishing amplitude of the positive dipulses and the increasing amplitude of the negative dipulses. Finally, the transducer 10 is entirely positioned over an adjacent track, such as the track 16, of FIG. 1 wherein the negative dipulse 140 is relatively large compared to the positive dipulse 142. The waveform A of FIG. 5 hence illustrates both of the extreme off-center conditions which may occur.

Figure 5:
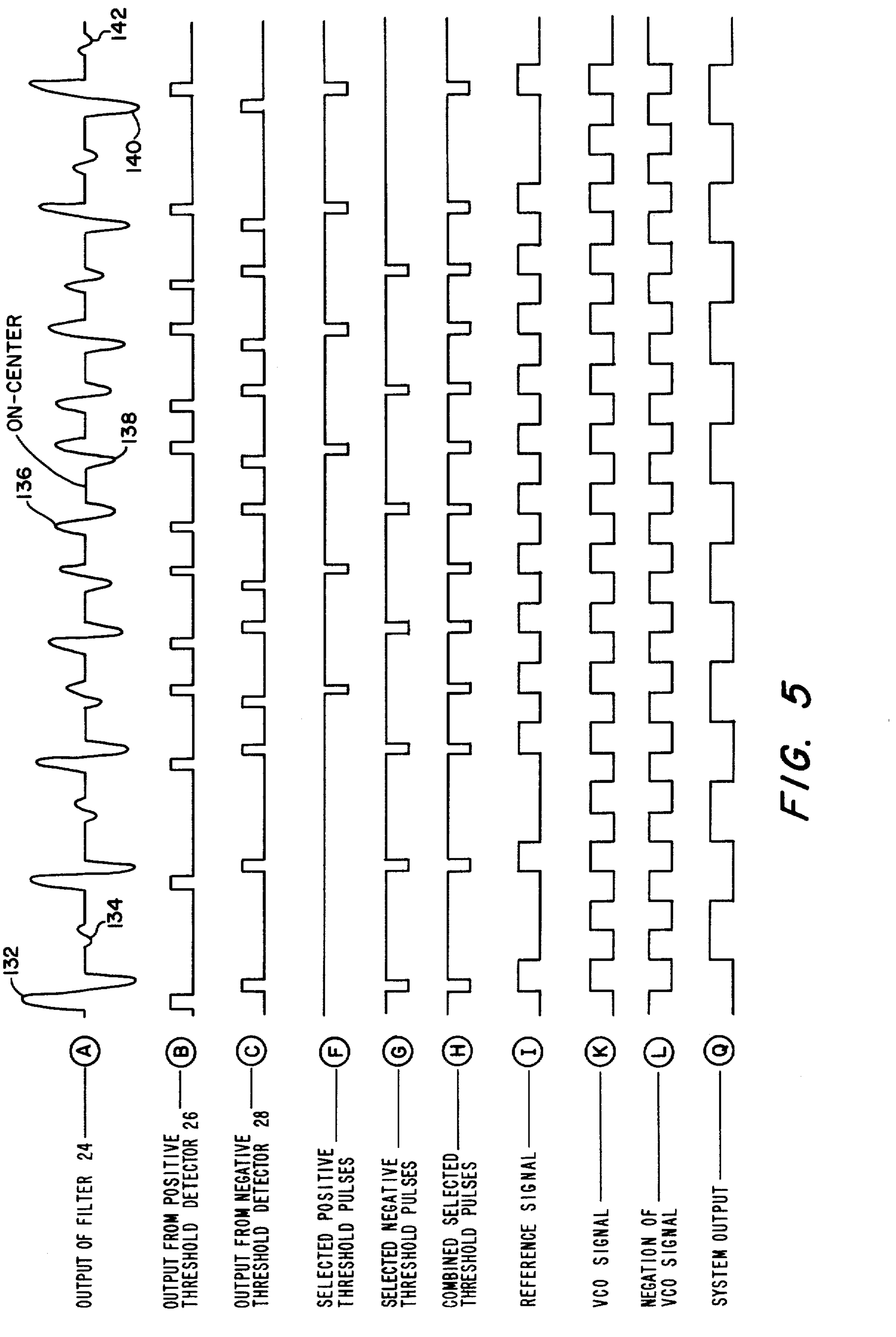
FIG. 5 illustrates another set of waveforms occurring at the designated locations in the phase locked loop clocking system of FIG. 2.

Turning now to the waveforms B and C of FIG. 5, it is seen that the positive and negative threshold detectors do not respond to the low-amplitude dipulses present in the waveform A. Specifically, the threshold detectors do not respond to those dipulses whose amplitudes do not exceed the threshold settings which have been preferably set at 50% of the amplitudes of the dipulses 136 and 138. When these situations occur, the phase locked loop clocking system experiences the equivalent of a complete dipulse drop-out. As has been previously pointed out, such dipulse drop-outs do not affect the operation of the phase locked loop clocking system. This is illustrated by the waveforms F through I of FIG. 5 wherein the selected threshold pulses of waveforms F, G, and H combine to produce the reference signal waveform I with various pulse drop-outs occurring when an insignificant dipulse has occurred in the waveform A. As has been previously explained, the phase detector 48 ignores these pulse drop-outs and does not generate an erroneous phase difference between the reference signal I and the VCO signal waveforms K and L. The result is an unaffected system output waveform Q.

It is to be noted that the threshold detectors do respond to the smaller dipulses in waveform A whose amplitudes exceed the threshold settings. When this occurs, the pulse selection circuit 42 selects the appropriate threshold pulses then occurring in the waveforms B and C and generates the appropriately selected threshold pulses in the waveforms F through I. The leading edges of the combined selected threshold pulses of the waveform H thereafter trigger the one shot 90 so as to produce reference pulses in the reference signal waveform I. The phase detector then detects any phase difference between these pulses and the pulses of waveforms K and L, and applies the same to the voltage controlled oscillator 50 via the low pass filter 52.

It is therefore to be appreciated that the phase locked loop clocking system 18 is operative in the extreme off-center positions as well as positions in between. This has been illustrated by the waveforms of FIG. 5.

The preferred embodiment of the phase locked loop clocking system in FIG. 4 has been limited to the particularly disclosed logic elements. It should nonetheless be understood that it is within the scope of the invention to cover structural equivalents of the detailed structure of FIG. 4. For instance, alternative phase detectors may be used to detect the phase difference of the voltage controlled oscillator with respect to the reference signal. Furthermore, the particularly disclosed phase detector 48 may be used in other phase locked loop clocking systems.

What is claimed is:

1. A phase locked loop clocking system for phase locking a clock signal with respect to an input signal consisting of a series of dipulses wherein each dipulse consists of two oppositely signed pulses, said phase locked loop clocking system comprising:

means for detecting a point occurring between the peaks of the first and second pulses of each dipulse;

means for generating a reference signal in response to the detected points;

means for detecting a phase difference between said reference signal and said clock signal; and means for controlling the frequency of the clock signal so as to increase or decrease the frequency of the clock signal in response to the detected phase difference.

2. The apparatus of claim 1 wherein said means for detecting a point occurring between the peaks of said first and second pulses comprises:

positive threshold detection means for detecting when a dipulse exceeds a positive threshold amplitude, said positive threshold detection means being operative to generate a threshold pulse during the time in which the amplitude of the dipulse exceeds the positive threshold amplitude; and negative threshold detection means for detecting when a dipulse exceeds a negative threshold amplitude, said negative threshold detection means being operative to generate a threshold pulse during the time in which the amplitude of the dipulse exceeds the negative threshold amplitude.

3. Th apparatus of claim 2 wherein said means for detecting a point occurring between the peaks of said first and second pulses further comprises:

means for selecting the threshold pulse output from only one of said threshold detection means during the occurrence of any one dipulse, and means for generating a train of selected threshold pulses wherein each selected threshold pulse defines a point on each dipulse occurring between the peaks of the first and second pulses of each dipulse.

4. The apparatus of claim 3 wherein the series of dipulses in the input signal comprises two types of dipulses, the first type of dipulse consisting of a first positively signed pulse followed by a second negatively signed pulse, the second type of dipulse consisting of a first negatively signed pulse followed by a second positively signed pulse, and said means for selecting the threshold pulse output from only one of the threshold detection means during the occurrence of any one dipulse comprises:

first gating means for gating the threshold pulse output of the positive threshold detection means, means for enabling said first gating means during the occurrence of the second type of dipulse whereby the threshold pulse output from the positive threshold detection means is selected each time a second type of dipulse occurs, second gating means for gating the threshold pulse output of the negative threshold detection means, and means for enabling said second gating means during the occurrence of the first type of dipulse whereby the threshold pulse output from the positive threshold detection means is selected each time a first type of dipulse occurs.

5. The apparatus of claim 4 wherein said means for enabling said first gating means during the occurrence of the second type of dipulse comprises:

means for gating the threshold pulse output from the negative threshold detection means during the occurrence of the second type of dipulse; and means for generating an enabling pulse in response to the gated threshold pulse output from the negative threshold detection means, and wherein said means for enabling said second gating means during the occurrence of the first type of dipulse comprises:

means for gating the threshold pulse output from the positive threshold detection means during the occurrence of the first type of dipulse, and means for generating an enabling pulse in response to the gated threshold pulse output from the positive threshold detection means.

6. The apparatus of claim 5 wherein each of said means for generating an enabling pulse comprises a one shot circuit which generates an output pulse that is equal to or greater than the time remaining in the then occurring dipulse.

7. The apparatus of claim 6 wherein said means for generating a reference signal in response to the detected points comprises:

means for generating a train of reference pulses wherein each reference pulse occurs in response to each selected threshold pulse in the train of selected threshold pulses from said means for generating a train of selected threshold pulses.

8. The apparatus of claim 7 wherein the train of reference pulses from said means for generating a train of reference pulses is applied to said means for detecting a phase difference between the clock signal and the reference signal, and wherein said means for detecting a phase difference comprises:

means for generating a phase lead pulse in response to a clock pulse in the clock signal terminating prior to the termination of a reference pulse in the reference signal, and means for generating a phase lag pulse in response to a reference pulse in the reference signal terminating prior to the termination of a clock pulse in the clock signal.

9. The apparatus of claim 8 wherein said means for generating a phase lead pulse comprises:

first means for gating the reference signal with the negation of the clock signal, and means for enabling said first gating means only when the clock signal leads the reference signal, and wherein said means for generating a phase lag pulse comprises:

second means for gating the clock signal with the negation of the reference signal, and means for enabling said second gating means when the clock signal lags the reference signal.

10. The apparatus of claim 9 wherein said means for enabling said first gating means when the clock signal leads the reference signal comprises:

a pair of cross coupled NAND gates, wherein the first NAND gate receives the reference signal and the second NAND gate receives the negation of te clock signal, the output of said second NAND gate being applied to said first gating means; and said means for enabling said gating means when the clock signal lags the reference signal comprises:

a pair of cross coupled NAND gates, wherein the first NAND gate receives the clock signal and the second NAND gate receives the negation of the reference signal, the output of said second NAND gate being applied to said second gating means.

11. The apparatus of claim 1 wherein said means for detecting a phase difference between the reference signal and the clock signal comprises:

first phase difference detecting means for gating the clock signal with the negation of the reference signal;

means for enabling said first phase difference detecting means when the clock signal lags the reference signal;

second phase difference detecting means for gating the reference signal with the negation of the clock signal; and means for enabling said second phase difference detecting means when the clock signal leads said reference signal.

12. the apparatus of claim 11 wherein said means for enabling said first phase difference detecting means comprises;

a pair of cross coupled NAND gates, wherein the first NAND gate receives the reference signal and the second NAND gate receives the negation of the clock signal, the output of said second NAND gate being applied to said first phase difference detecting means; and said means for enabling said second phase difference detecting means comprises;

a pair of cross coupled NAND gates, wherein the first NAND gate receives the clock signal and the second NAND gate receives the negation of the reference signal, the output of said second NAND gate being applied to said second phase difference detecting means.

13. In a phase locked loop clocking system wherein a voltage controlled oscillator generates a clock signal comprising a train of clock pulses that are phase locked with respect to a reference signal having reference pulses of a fixed pulse width, apparatus for detecting a phase difference between the clock signal and the reference signal only when a reference pulse is present in the reference signal comprising:

means for generating a phase lead pulse in response to a clock pulse terminating prior to the termination of a reference pulse, and means for generating a phase lag pulse in response to a reference pulse terminating prior to the termination of a clock pulse.

14. The apparatus of claim 13 wherein said means for generating a phase lead pulse comprises:

first means for gating the reference signal with the negation of the clock signal, and means for enabling said first gating means only when the clock signal leads the reference signal, and wherein said means for generating a phase lag pulse comprises:

second means for gating the clock signal with the negation of the reference signal, and means for enabling said second gating means only when the clock signal lags the reference signal.

15. The apparatus of claim 14 wherein said means for enabling said first gating means comprises:

a pair of cross coupled NAND gates, wherein the first NAND gate receives the reference signal and the second NAND gate receives the negation of the clock signal, the output of said second NAND gate being applied to said first gating means; and said means for enabling said second gating means comprises:

a pair of cross-coupled NAND gates, wherein the first NAND gate receives the clock signal and the second NAND gate receives the negation of the reference signal, the output of said second NAND gate being applied to said second gating means.

16. a phase locked loop clocking system for phase locking a clock signal with respect to a moving magnetic medium wherein said moving magnetic medium comprises at least two tracks, said first track containing spaced sets of flux reversals to and from a first magnetic state, and said second track containing spaced sets of flux reversals to and from a second magnetic state, said phase locked loop clocking system comprising;

transducing means positioned in transducing relationship with said first and second tracks and responsive to said sets of flux reversals for producing pairs of first and second pulses of opposite signal polarity;

means for generating a reference signal in response to the detected points;

means for detecting a phase difference between said reference signal and said clocking signal; and means for controlling the frequency of said clocking signal so as to increase or decrease the frequency in response to a detected phase difference.

17. The apparatus of claim 16 wherein said means for detecting a point occurring between the peaks of said first and second pulses of opposite signal polarity comprises:

positive threshold detection means for detecing when a pulse exceeds a positive threshold amplitude, said positive threshold detection means being operative to generate a threshold pulse during the time in which the amplitude of the pulse from said transducing means exceeds the positive threshold amplitude; and negative threshold detection means for detecting when a pulse exceeds a netative treshold amplitude, said negative threshold detection means being operative to generate a threshold pulse during the time in which the amplitude of the pulse from said transducing means exceeds the negative threshold amplitude.

18. The apparatus of claim 16 wherein said means for detecting a point occurring between the peaks of the first and second pulses further comprises:

means for selecting the threshold pulse output from only one of the threshold detection means during the occurrence of any one pair of first and second pulses, and means for generating a train of selected threshold pulses wherein each selected threshold pulse defines a point occurring between the peaks of the first and second pulses.

19. The apparatus of claim 18 wherein the pairs of first and second pulses of opposite signal polarity from said transducing means comprise two types of pulse pairings, the first type of pulse pairing consisting of a first positively signed pulse followed by a second negatively signed pulse, the second type of pulse pairing consisting of a first negatively signed pulse followed by a second positively signed pulse, and said means for selecting the threshold pulse output from only one of the threshold detection means during the occurrence of any one pair of pulses comprises:

first gating means for gating the threshold pulse output of the positive threshold detection means, means for enabling said first gating means during the occurrence of the second type of pulse pairing whereby the threshold pulse output from the positive threshold detection means is selected each time the second type of pulse pairing occurs, second gating means for gating the threshold pulse output of the negative threshold detection means, means for enabling said second gating means during the occurrence of the first type of paired pulses whereby the threshold pulse output from the positive threshold detection means is selected each time the second type of pulse pairing occurs.

20. The apparatus of claim 19 wherein said means for enabling said first gating means during the occurrence of the second type of pulse pairing comprises:

means for gating the threshold pulse output from the negative threshold detection means during the occurrence of the second type of pulse pairing; and means for generating an enabling pulse in response to the gated threshold pulse output from the negative threshold detection means, and wherein said means for enabling said second gating means during the occurrence of the first type of pulse pairing comprises:

means for gating the threshold pulse output from the positive threshold detection means during the occurrence of the first type of pulse pairing, and means for generating an enabling pulse in response to the gated threshold pulse output from the positive threshold detection means.

21. The apparatus of claim 20 wherein said means for generating a reference signal in response to the detected points comprises:

means for generating a train of reference pulses wherein each reference pulse occurs in response to each selected threshold pulse in the train of selected threshold pulses from said means for generating a train of selected threshold pulses.

22. The apparatus of claim 21 wherein the train of reference pulses from said means for generating a train of reference pulses is applied to said means for detecting a phase difference between the clock signal and the reference signal, and wherein said means for detecting a phase difference comprises:

means for generating a phase lead pulse in response to a clock pulse in the clock signal terminating prior to the termination of a reference pulse in the reference signal, and means for generating a phase lag pulse in response to a reference pulse in the reference signal terminating prior to the termination of a clock pulse in the clock signal.

23. The apparatus of claim 22 wherein said means for generating a phase lead pulse comprises:

first means for gating the reference signal with the negation of the clock signal, and means for enabling said first gating means only when the clock signal leads the reference signal, and wherein said means for generating a phase lag pulse comprises:

second means for gating the clock signal with the negation of the reference signal, and means for enabling said second gating means when the clock signal lags the reference signal.

24. The apparatus of claim 23 wherein said means for enabling said first gating means when the clock signal leads the reference signal comprises:

a pair of cross coupled NAND gates, wherein the first NAND gate receives the reference signal and the second NAND gate receives the negation of the clock signal, the output of said second NAND gate being applied to said first gating means; and said means for enabling said second gating means when the clock signal lags the reference signal comprises:

a pair of cross coupled NAND gates, wherein the first NAND gate receives the clock signal and the second NAND gate receives the negation of the reference signal, the output of said second NAND gate being applied to said second gating means.

* * * * *